Oct. 20, 1964  R. C. ACKER ETAL  3,153,424
BALANCED PRESSURE REGULATOR VALVE
Filed Oct. 31, 1960  2 Sheets-Sheet 2

INVENTORS
RICHARD C. ACKER,
PAUL J. MILLER
BY & AUSTIN E. PETTYJOHN.
RICHEY, McNENNY & FARRINGTON.
ATTORNEYS

United States Patent Office 3,153,424
Patented Oct. 20, 1964

3,153,424
BALANCED PRESSURE REGULATOR VALVE
Richard C. Acker, Chagrin Falls, Paul J. Miller, Maple Heights, and Austin E. Pettyjohn, Wickliffe, Ohio, assignors to The Weatherhead Company, Cleveland, Ohio, a corporation of Ohio
Filed Oct. 31, 1960, Ser. No. 66,095
5 Claims. (Cl. 137—505.41)

This invention relates generally to fluid pressure regulating valves and more particularly to pressure regulating valves of the balanced poppet design adapted to control fluid flow to produce a constant outlet pressure at varying rates of flow.

Pressure regulating valves are used in missiles in connection with the pressurizing of fuel tanks. The pressure in the tank regulates the rate of fuel flow to the motor, and therefore requires precise regulation for maximum efficiency. However, the pressure source for the fuel tanks is a bottle of compressed gas, and the pressure in the bottle naturally drops as the gas flows out of the bottle and into the emptying fuel tank. The pressure regulator must therefore deliver the same constant control pressure when the gas bottle is nearly empty as it did when the bottle was full. Such an application may require that the outlet pressure vary no more than 4% from the regulated value even though the inlet pressure varies between 5 and 150 p.s.i. over the outlet pressure. Furthermore, such control must be maintained over a broad range of ambient temperatures and a wide range of rates of flow. The regulator of the present invention will operate safely and efficiently under these extreme conditions.

The principal object to this invention is to provide a fluid pressure regulator for gases which maintains accurately a relatively low constant outlet pressure over a wide range of relatively high inlet pressures with greatly varying rates of outlet flow and over a broad temperature range.

Another object of this invention is to provide in a pressure regulating valve a novel dampening action to control flow of fluid into and out of the diaphragm chamber and thereby prevent instability and oscillation as a result of rapid changes in the rate of fluid flow through the valve.

Another object of this invention is to provide a pressure regulating valve having a novel metering or flow compensating orifice in conjunction with one of the valve poppets to provide a back pressure on the associated poppet tending to additionally bias the poppet toward the open position when the valve is operating at relatively high rates of fluid flow.

Another object of this invention is to provide a pressure regulating valve of the balanced double poppet type in which the fluid pressure forces on the poppets are unbalanced at lockup when there is no fluid flow through the valve and in which the forces on the poppets are balanced during fluid flow by a dynamic force created by fluid flow past one of the poppets.

Another object of this invention is to provide in a pressure regulating valve of the balanced poppet construction a novel construction for mounting the valve poppets to allow a simple and low cost adjustment for the seating of both valve poppets together as a unit.

Still another object of this invention is to provide a pressure regulating valve of relatively small size and yet having a high flow capacity with a minimum stroke for the valve poppets to allow rapid response to transient changes in the rate of flow with a minimum of pulsation and variation in the pressure of the outlet fluid.

Further objects and advantages of this invention will readily become apparent to those skilled in the art upon further understanding of the invention, one embodiment of which is disclosed in the drawings and described in detail in the following description.

In the drawings:

FIG. 3 is a cross-sectional view taken along line 3—3 of FIG. 2.

Figure 1:
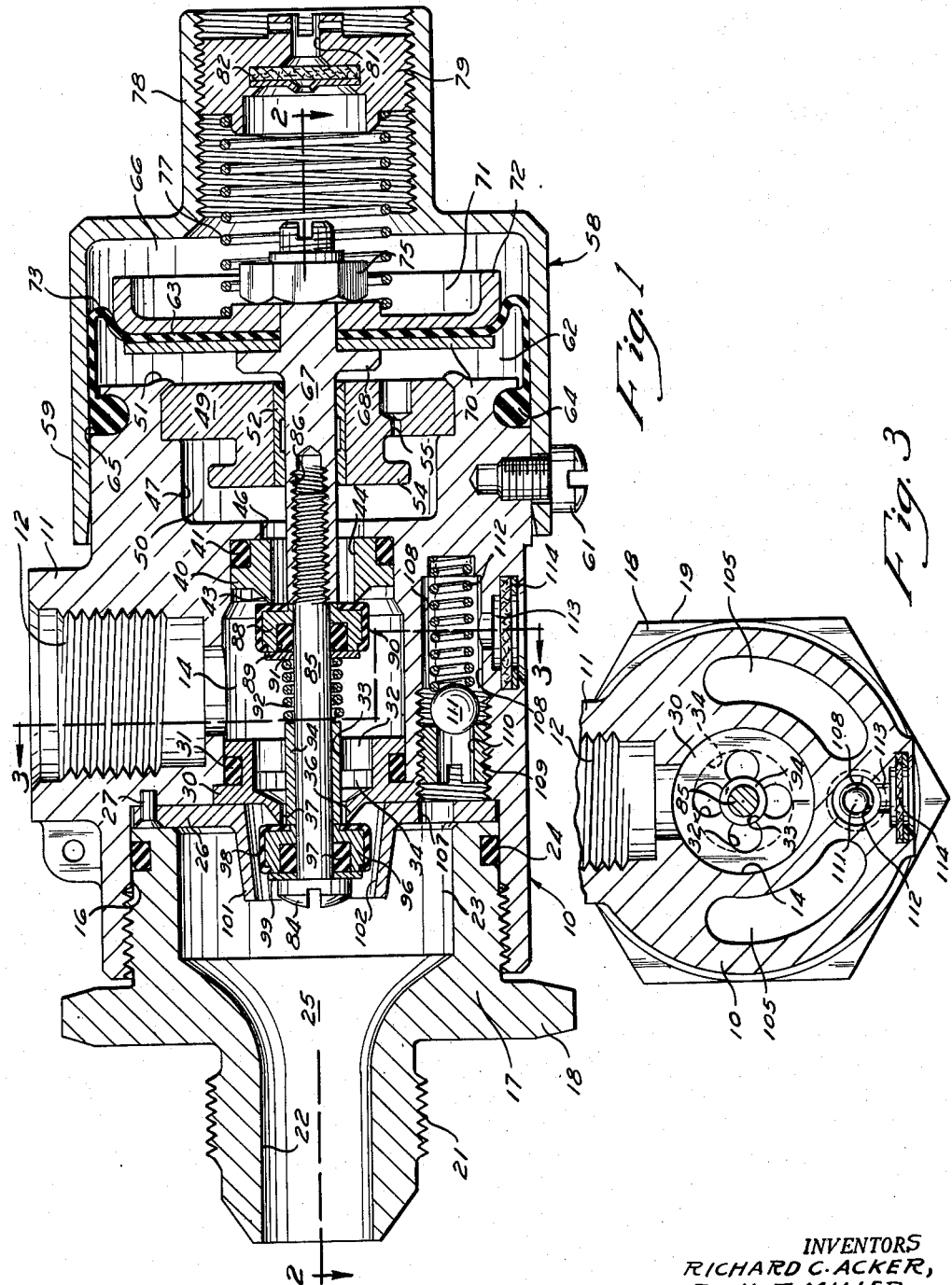
FIG. 1 is a longitudinal cross-sectional view through a fluid pressure regulating valve embodying the present invention and showing the valve in the closed position.
Figure 2:
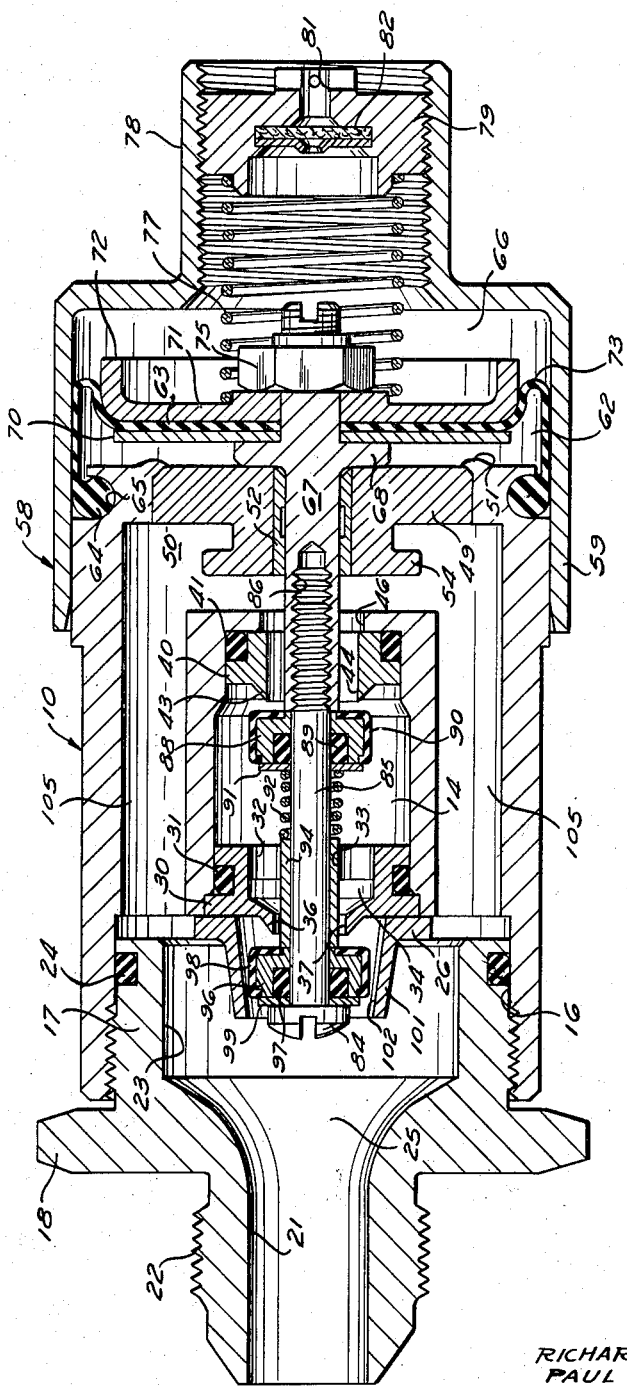
FIG. 2 is a longitudinal cross-sectional view taken on line 2—2 of FIG. 1, but showing the valve in the fully open position.

Referring to the figures in greater detail, the pressure regulating valve has a body 10 having a generally cylindrical outer surface. A boss 11 on the side of body 10 is provided with a threaded inlet passage 12 adapted to receive a suitable fitting and opens into a central chamber 14 which is generally cylindrical and coaxial with the longitudinal axis of body 10. At one end, central chamber 14 opens into an enlarged counterbore 16 which is threaded to receive an outlet fitting 17. Outlet fitting 17 is provided with an enlarged flange 18 having wrench receiving flats 19. Outwardly of flange 18, outlet fitting 17 has a threaded fitting portion 21 through which extends an axial bore 22. The inner end of bore 22 opens into an enlarged bore 23 forming a chamber 25 at the end of the outlet fitting adjacent the central chamber 14. The outlet fitting 17 is provided with a groove to receive an O-ring seal 24 to insure a fluid tight seal between the outlet fitting and body 10. An orifice plate 26 having an outer diameter substantially equal to that of counterbore 16 is fitted within the counterbore between the end of outlet fitting 17 and body 10. A locating pin 27 prevents the orifice plate 26 from rotating with respect to body 10.

A valve seat insert 30 is positioned within the central chamber 14 adjacent the enlarged counterbore 16 and is held in place by the orifice plate 26. A suitable O-ring seal 31 is provided to prevent the escape of fluid at the joint between valve seal insert 30 and the valve body. As indicated more clearly in FIG. 3, on the side away from orifice plate 26, the valve seat insert 30 is provided with a plurality of passage holes 32, shown as four in number, spaced symmetrically at equal distances about the central axis. The radially projecting portions of the valve seat insert between the passage holes 32 define a centrally located bearing bore 33 for support of the poppet stem as will be indicated in greater detail hereinafter. A recessed chamber 34 is located within valve seat insert 30 beyond the passage holes 32 and is closed off at the other side by means of the valve seat portion 36 which defines a fluid passage bore 37.

At the other end of the central chamber 14, is a second valve seat insert 40 which is fitted within a slightly reduced portion of the central chamber 14 and sealed by an O-ring seal 41. Valve seat insert 40 has a cylindrical passage bore 44 having a diameter slightly greater than that of the fluid passage bore 37 in the other valve seat insert 30. Passage bore 44 extends axially through the insert to connect with a reduced bore portion 46 on the valve body 10. A suitable valve seat portion 43 is formed around the inner end of passage bore 44 adjacent the central chamber 14.

The reduced bore 46 opens into an enlarged counterbore 47. A guide plate 49 is fitted within the outer end of counterbore 47 and held in place by suitable means such as staking indicated at 51 to define a chamber 50 within the counterbore 47. As is shown more clearly in FIG. 3, the valve body 10 is provided with a pair of longitudinal pasasges 105 radially outward of the central chamber 14 to conduct the fluid entering chamber 50 through valve seat insert 40 back into the outlet chamber 25. A suitable sleeve bearing insert 52 extends axially through the guide plate 49 to provide a bearing for the poppet stem as will be described in greater detail hereinafter. Guide plate 49 is provided with a flanged baffle plate or disc 54 within the chamber 50, and to permit the fluid within chamber 50 to pass outward into the diaphragm chamber, a small pasasge 55 is drilled through the guide plate 49 at a lesser radial distance from the central axis than the outer radius of the baffle flange 54.

A diaphragm housing 58 having a sleeve portion 59 is fitted over the end of valve body 10 and secured in place by means of suitable screws 61 spaced around its periphery. A flexible rubber diaphragm 63 is mounted within the diaphragm housing 58 and has a bead portion 64 which fits within a circumferential groove 65 on the valve body 10. A poppet stem 67 is journaled within the bearing insert 52 on guide plate 49 and is provided with a radial flange 68 adjacent its midpoint to provide a support for a washer 70. The diaphragm 63 is secured to the poppet stem 67 between the washer 70 and a piston 71. Piston 71 is provided with an axially extending flange 72 around its outer periphery to form the diaphragm 63 into a convolution indicated at 73 so that the movement of the piston 71 causes the diaphragm to move with a rolling motion rather than a flexing motion to minimize the fractional resistance of the diaphragm. The piston 71 is held in place by means of a suitable nut 75 threaded on the outer end of the poppet stem 67. Thus, diaphragm 63 divides the interior of diaphragm housing 58 into a diaphragm chamber 62 on the side adjacent the valve body 10 and an outer chamber 66 on the piston side of the diaphragm.

A biasing force for the piston 71 and diaphragm 63 is provided by a helical compression or control spring 77 which abuts at its one end on piston 71 and extends outwardly through the neck portion 78 on the diaphragm housing 58. At its other end, spring 77 abuts against a threaded plug 79 fitted within the neck portion 78 and which may be screwed inward and outward along the neck 78 to adjust the biasing force upon piston 71 and hence the outlet pressure of the regulator. Threaded plug 79 is provided with a vent hole 81 fitted with a filter insert 82 to permit free exchange of air between the chamber on the outer side of diaphragm 63 and the atmosphere.

The other end of poppet stem 67 is provided with a threaded bore 86 to receive an elongated poppet mounting screw 85. A poppet 88 is mounted on screw 85 adjacent the end of poppet stem 67 and provided with an internal O-ring seal 89 to prevent escape of fluid between poppet 88 and screw 85. Poppet 88 has an outer surface covering 90 formed from a suitable rubber or resilient sealing material and adapted to make sealing contact against the valve seat portion 43 on valve seat insert 40. A washer 91 is positioned around poppet mounting screw 85 adjacent poppet 88 to absorb the thrust of a compression spring 92 which biases the poppet 88 into contact with the end of poppet stem 67. The other end of spring 92 abuts against a spacer sleeve 94 surrounding the screw 85 and journaled to slide within the bearing bore 33 within the valve seat insert 30. On the outer end of screw 85 is mounted another poppet 96 having an O-ring seal 97 to prevent escape of fluid from between the poppet 96 and the screw 85. Poppet 96 is similar in construction to poppet 88 and is provided with a rubber covering 98 adapted to make sealing contact with the valve seal portion 36 on valve seat insert 30. A washer 99 is provided beneath the head 84 of screw 85 to receive the biasing force exerted upon poppet 96 by the spring 92.

The above described construction by which the poppets 88 and 96 are secured to the poppet stem 67 allows a rapid and accurate adjustment of the relative spacing between the poppets to insure that they both make even and uniform seating contact with the valve seat inserts 30 and 40. The action of compression spring 92 is to bias the poppet 88 into contact with the end of poppet stem 67 and by its reaction bias the poppet 96 into contact with the screw head 84. Thus, rotation of the screw 85 will move it inwardly and outwardly relative to the poppet stem 67 to determine the spacing of the screw head 84 from the poppet stem 67 and thereby adjust the spacing between the poppets 88 and 96. By adjusting the screw 85 during the assembly of the pressure regulating valve, the poppets 88 and 96 may be adjusted to the proper spacing so that they make uniform and simultaneous sealing contact with the valve seat inserts 30 and 40. Since the pressure regulating valve is of the balanced poppet construction, the high inlet fluid pressure within the central chamber 14 exerts a biasing force upon poppet 88 in the direction of poppet stem 67 and on the poppet 96 in the direction of the screw head 84. Therefore, none of the pressure sealing forces exerted upon the poppets 88 and 96 will exert any compressive force upon the spring 92, and this spring may therefore be of relatively light construction since it absorbs none of the sealing forces in the valve.

The orifice plate 26 is provided with an orifice sleeve 101 surrounding the poppet 96. Orifice sleeve 101 is provided with a conical bore 102 which tapers inwardly away from poppet 96. The orifice plate 26 is also provided with a hole 107 which leads from chamber 25 within the outlet fitting 17 into a threaded bore 108 in the valve body 10. A plug 109 is threaded in bore 108 and is in turn provided with an internal bore 110. A ball 111 seats against plug 109 under the biasing action of spring 112 to serve as a pressure relief valve in case the pressure within the outlet chamber 25 exceeds a predetermined value. When this relief valve is opened, ball 111 moves away from plug 109 to compress spring 112, and fluid will then pass from chamber 25 out through bores 108 and 110 to an outlet opening 113 which is provided with a suitable filter indicated at 114.

Turning now to the operation of the valve, when the valve is disconnected so that the pressure at the inlet 12 and central chamber 14 is the same as that at the outlet, the poppets will be in the open position under the biasing force of control spring 77 which shifts the poppet stem 67 to bring flange 68 into contact with the guide plate 49 which limits movement of stem 67 in the open position. When the inlet 12 is connected to a fluid pressure source, central chamber 14 is pressurized and fluid will flow out through the passage bores 37 and 44 in the valve seat inserts 30 and 40, respectively. Thus the chambers 25 and 50 will be pressurized, and the fluid pressure in chamber 50 will be communicated through the passage 55 in guide plate 49 in the diaphragm chamber 62. As the pressure builds up within diaphragm chamber 62, the diaphragm and piston are moved in a direction to compress the control spring 77 and shift the poppet stem 67 to bring the poppets 88 and 96 into seating contact with their respective valve seat inserts.

If the pressure at the outlet of the valve drops, fluid within the diaphragm chamber 62 will flow outward through the passage 55 into the chamber 50 and as a result of the drop in pressure within the diaphragm chamber 62, the control spring 77 will move the piston and poppet stem 67 to open the poppets and allow the fluid under high pressure within the central chamber 14 to flow outward through the outlet bores 37 and 44 until the pressure balance is restored. Thus, the operation of the two valve poppets 88 and 96, which moves in unison, is generally dependent upon the force balance between the pressure within diaphragm chamber 62 and the biasing force of the control spring 77.

When a pressure regulating valve is operated at or near the zero flow condition where there is no air passing through the valve, the outlet pressure in valves of the balanced poppet design must be higher than the outlet pressure during nominal flow in order to obtain fluid tight sealing of the poppets. According to the present invention, however, the poppets will close at substantially the same outlet pressure as the valve is adjusted to for normal rate of flow. As previously stated, the passage bore 44 in valve seat insert 40 is slightly larger in diameter than the corresponding passage bore 37 in valve seat insert 30. Thus when the poppets are in sealing contact with their valve seat inserts, the effective sealed area covered by the poppet 88 is slightly greater than that covered by poppet 96. Since the high inlet pressure within chamber 14 is acting upon both of these poppets, producing forces tending to open poppet 96 and close poppet 88, the force exerted on poppet 88 will be slightly greater than that exerted on poppet 96 because of the greater area of the passage bore 44. Thus the net effect of the high pressure within central chamber 14 is to maintain the poppets in tight sealing contact with their respective valve seats.

This unbalanced pressure closing force, which is small because of the relatively small difference between the area beneath poppet 88 and beneath poppet 96, is relieved by a back pressure on poppet 96 when the poppets are opened to allow fluid flow through the valve. As poppet 96 moves outward from valve seat insert 30, it moves along the tapered bore 102 in the orifice sleeve 101. Since fluid must pass through the clearance space between the poppet and the orifice sleeve, fluid flow is restricted at this point and a back pressure is created on the inside surface of poppet 96. This back pressure tends to open the poppets 96 and 88 and therefore compensates for the unbalanced pressure closing force produced by the size differential between passage bores 37 and 44.

A general tendency of pressure regulating valves having a high pressure differential across the valve is that they require a continually decreasing outlet pressure to obtain increased rates of flow, because the biasing force of the control spring is decreased as it is extended to a greater length when the valve poppets are open. Thus such valves tend not only to show variations in outlet pressure with different rates of fluid flow, but they also have a tendency to act in an erratic manner during rapid and transient changes in the rate of outlet flow. In the present invention, these problems are overcome by the provision of the guide plate 49 and the orifice sleeve 101.

It will be seen that as fluid flows through the passage bore 44 in valve seat insert 40 into the chamber 50, it impinges upon the baffle flange 54 on guide plate 49. The effect of baffle flange 54 is to direct the fluid laterally so that it will flow through the passages 105 into the outlet chamber 25. Thus the fluid deflected by the baffle flange 54 passes laterally with respect to the baffle flange and thereby creates a slight reduction in the pressure in the region around the guide plate behind the flange. Since the passage 55 which connects chamber 50 with the diaphragm chamber 52 opens into this area, high rates of fluid flow will tend to produce a lowering of the pressure at the connecting passage 55 and within the diaphragm chambers 62. This allows the control spring 77 to open the poppets slightly wider and provide full fluid flow without noticeable reduction in the outlet pressure.

It is also understood that the connecting passage 55 is relatively small in size so as to provide a restriction in the fluid flow between the chambers 50 and 62. For this reason, a high inrush flow into the chamber 50 tending to create a reduction of pressure within the diaphragm chamber 62 will not cause a sudden fluctuation or movement of the diaphragm and piston, since the fluid within the relatively large diaphragm chamber 62 can flow out through the passage 55 at only a relatively low rate. Thus the passage 55 allows the diaphragm chamber 62 to also act as a dampening chamber to minimize the possibilities of rapid fluctuation or oscillation in the movement of the piston and the diaphragm during sudden changes in the rate of flow of the fluid through the valve.

As described above, the orifice sleeve 101 provides a restriction to fluid flow past the poppet 96 and thereby creates a back pressure tending to open the poppets 88 and 96. Since bore 102 tapers in an outward direction, the clearance space between the outer surface of poppet 96 and the tapered bore 102 decreases as the poppet opens to create an increasing restriction in the flow of fluid past the poppet. This increasing restriction increases the back pressure on the inside surface of poppet 96 at a rate determined by the diameter and taper of bore 102. This increasing back pressure serves as an additional biasing force to that exerted by the control spring 77 tending to open both of the poppets. Thus the orifice sleeve 101 serves as a flow compensating device tending both to balance the forces on the poppets at low rates of flow and to open the poppets farther at higher rates of flow to prevent a drop in the outlet pressure at these higher rates of flow.

Another feature of the orifice sleeve 101 is that it directs the fluid flowing past the poppet 96 through the orifice sleeve axially outward through the center of outlet fitting bore 22 while the fluid which passed through the other valve seat insert into chamber 50 and hence back through the passages 105 in the valve body passes along the outside adjacent the outer walls of the outlet fitting. Thus the flow from both directions is channeled to prevent turbulence and interference which would tend to create a restriction in the valve. By directing the flow of air along the two paths to the outlet fiting 21 in this manner, higher rates of fluid flow through the valve can be achieved without increasing the size of the outlet fitting.

It will be understood from the foregoing description that a pressure regulating valve incorporating the present invention will be able to provide high degree of regulation of the outlet pressure over a wide range of rates of outlet flow from zero flow up to the maximum rating, and that because of the balanced design the outlet pressure will be substantially unaffected by wide variations in the pressure at the inlet of the valve. However, the invention is not limited to the particular design shown and described, and various modifications and rearrangements can be made therein without departing from the scope of the invention as defined in the following claims.

What is claimed is:

1. A pressure regulator comprising a valve body, said valve body having an inlet chamber and an outlet chamber, a pair of axially aligned valve seats each interconnecting said inlet chamber and said outlet chamber, a valve poppet associated with each of said valve seats, stem means interconnecting said valve poppets for synchronous movement toward and away from their respective valve seats, spring means biasing said poppets away from said valve seats, means responsive to the pressure in said outlet chamber biasing said poppets toward said valve seats, and means for progressively increasing the restriction of fluid flow around one of said poppets as said one poppet moves away from its associated valve seat to produce an increasing biasing force on said one poppet tending to shift said one poppet away from its valve seat and compensate for the decreasing biasing force of said spring means.

2. A pressure regulator comprising a valve body, said valve body having an inlet chamber and an outlet chamber, a pair of axially aligned valve seats each interconnecting said inlet chamber and said outlet chamber, a valve poppet associated with each of said valve seats, stem means interconnecting said valve poppets for synchronous movement toward and away from their respective valve seats, an orifice sleeve surrounding one of said valve poppets, said orifice sleeve having an internal bore tapering inwardly and outwardly away from the adjacent valve seat.

3. A pressure regulator comprising a valve body, said valve body having an inlet chamber and a pair of opposed outlet chambers, a pair of axially aligned valve seats, each valve seat interconnecting said inlet chamber and one of said outlet chambers, a valve poppet associated with each of said valve seats, one of said poppets being located in one of said outlet chambers, the other of said poppets being located in said inlet chamber, stem means interconnecting said valve poppets for synchronous movement toward and away from their respective valve seats, spring means biasing said poppets away from said valve seats, means responsive to the pressure in the other of said outlet chambers biasing said poppets toward said valve seats, and an orifice sleeve surrounding said one poppet, said orifice sleeve having means for progressively increasing the restriction of fluid flow around said one poppet as said one poppet moves away from its associated valve seat to produce an increasing biasing force on said one poppet tending to shift said one poppet away from its valve seat and compensate for the decreasing biasing force of said spring means.

4. A pressure regulator comprising a valve body, said valve body having an inlet chamber and an outlet chamber, a pair of axially aligned valve seats each interconnecting said inlet chamber and said outlet chamber, a fluid passage bore associated with each of said valve seats, a valve poppet associated with each of said valve seats adapted to close off the adjacent fluid passage bore, a valve stem interconnecting said valve poppets for synchronous movement toward and away from said valve seats, said valve stem passing through both of said fluid passage bores, one of said fluid passage bores having a greater effective area than the other of said fluid passage bores to provide an unbalanced force in the closed position biasing said poppets against said valve seats, and means responsive to fluid flow past one of said poppets to provide a progressively increasing biasing force as said poppets move away from their respective valve seats biasing said poppets away from said valve seats to compensate for the unbalanced closing forces resulting from the different effective areas of said fluid passage bores.

5. A pressure regulator comprising a valve body, said valve body having an inlet chamber and a pair of opposed outlet chambers, a pair of axially aligned valve seats, each valve seat interconnecting said inlet chamber and one of said outlet chambers, a fluid passage bore associated with each of said valve seats, a valve poppet associated with each of said valve seats adapted to close off the adjacent fluid passage bore, a valve stem interconnecting said valve poppets for synchronous movement toward and away from said valve seats, said valve stem passing through both of said fluid passage bores, one of said fluid passage bores having a greater effective area than the other of said fluid passage bores to provide an unbalanced force in the closed position biasing said poppets against said valve seats, and an orifice sleeve surrounding said one valve poppet, said orifice sleeve having means for progressively increasing the restriction of fluid flow around said one poppet as said one poppet moves away from its associated valve seat to produce a progressively increasing back pressure on said one poppet biasing said poppets away from said valve seats to compensate for the unbalanced closing forces resulting from the different effective areas of said fluid passage bores.

References Cited in the file of this patent

UNITED STATES PATENTS

| | | |
|---|---|---|
| 2,294,314 | McKinley | Aug. 25, 1952 |
| 2,730,269 | Earle | Jan. 10, 1956 |
| 2,890,713 | Semon | June 16, 1960 |
| 2,920,647 | Mercier | Jan. 12, 1960 |
| 2,941,543 | Kleczek | June 21, 1960 |
| 2,946,344 | Mott | July 26, 1960 |
| 3,025,873 | Ray | Mar. 20, 1962 |
| 3,053,271 | Crittenden | Sept. 11, 1962 |

FOREIGN PATENTS

| | | |
|---|---|---|
| 782,284 | Great Britain | Sept. 4, 1957 |
| 1,057,408 | Germany | May 14, 1959 |